United States Patent
Maron

(10) Patent No.: US 8,136,891 B2
(45) Date of Patent: Mar. 20, 2012

(54) METHOD AND CONTROL SYSTEM FOR APPLYING DEFINED CLAMPING FORCES

(75) Inventor: Christof Maron, Kelkheim (DE)

(73) Assignee: Continental Teves AG & Co., Ohg, Frankfurt (DE)

( * ) Notice: Subject to any disclaimer, the term of this patent is extended or adjusted under 35 U.S.C. 154(b) by 1248 days.

(21) Appl. No.: 11/578,643

(22) PCT Filed: Apr. 15, 2005

(86) PCT No.: PCT/EP2005/051671
§ 371 (c)(1),
(2), (4) Date: Aug. 3, 2007

(87) PCT Pub. No.: WO2005/100114
PCT Pub. Date: Oct. 27, 2005

(65) Prior Publication Data
US 2008/0121469 A1      May 29, 2008

(30) Foreign Application Priority Data

Apr. 17, 2004  (DE) .......................... 10 2004 018 729
Mar. 11, 2005  (DE) .......................... 10 2005 011 267

(51) Int. Cl.
*B60T 13/74* (2006.01)
(52) U.S. Cl. .......................................... 303/20; 303/155
(58) Field of Classification Search ............... 303/20, 303/155; 188/1.11 E; 701/70
See application file for complete search history.

(56) References Cited

U.S. PATENT DOCUMENTS

| | | | | |
|---|---|---|---|---|
| 6,178,369 B1 * | 1/2001 | Bohm | | 701/70 |
| 6,217,131 B1 * | 4/2001 | Schanzenbach | | 303/112 |
| 6,422,659 B2 * | 7/2002 | Disser | | 303/20 |
| 6,435,625 B1 * | 8/2002 | Schwarz et al. | | 303/20 |
| 6,662,906 B1 * | 12/2003 | Bohm et al. | | 188/1.11 E |
| 6,848,756 B2 * | 2/2005 | Maron et al. | | 303/155 |
| 6,932,438 B2 * | 8/2005 | Maron | | 303/20 |
| 7,920,951 B2 * | 4/2011 | Maron | | 701/70 |
| 2007/0282511 A1 * | 12/2007 | Henry | | 701/70 |

FOREIGN PATENT DOCUMENTS

| | | |
|---|---|---|
| DE | 19730094 | 1/1999 |
| DE | 19826133 | 12/1999 |
| DE | 10205013 | 2/2003 |
| WO | 9903714 | 1/1999 |
| WO | 0168428 | 9/2001 |
| WO | 03011668 | 2/2003 |

* cited by examiner

*Primary Examiner* — Bradley King

(57) ABSTRACT

Disclosed are a method and a control system for applying defined clamping forces in a brake that is electrically operable by means of an actuator and includes a first friction surface (friction lining) and a second friction surface (brake disc). In the method, a correlation exists between the actuator position and the clamping force, and values of the clamping force as well as of the actuator position are determined by a clamping force sensor and a position sensor, and a value of the actuator position is determined, which corresponds to the application of the first friction surface on the second friction surface.

7 Claims, 3 Drawing Sheets

METHOD AND CONTROL SYSTEM FOR APPLYING DEFINED CLAMPING FORCES

This application is the U.S. national phase of international application PCT/EP05/51671 filed Apr. 15, 2005, which designated the U.S. and which claims the benefit of priority of German Patent Application Number 10 2005 011 267.6 filed Mar. 11, 2005 and German Patent Application Number 10 2004 018 729.0 filed Apr. 17, 2004. The contents of each of the aforementioned documents are incorporated herein in their entirety.

BACKGROUND OF THE INVENTION

The present invention relates to a method for applying defined clamping forces in a brake that is electrically operable by means of an actuator and includes a first friction surface (friction lining) and a second friction surface (brake disc), in between which a clearance is allowed, wherein the application of the first friction surface on the second friction surface is determined, wherein a correlation exists between the actuator position and the clamping force, wherein values of the clamping force as well as of the actuator position are determined, the values being measured by means of a clamping force sensor and a position sensor, with an assessed value of the actuator position being produced which corresponds to the application of the first friction surface on the second friction surface.

International patent application WO 01/68428 discloses a method and a control system for applying defined clamping forces in a disc brake that is operable by means of an electric motor using a reduction gear. The special features of the prior art method involve that the above-mentioned correlation between the actuator position and the clamping force is illustrated by a mathematical model, preferably by a polynomial of second order. When realizing the prior art method, however, updating of the assessed value of the actuator position which is referred to as position sensor offset valve, does not occur continuously, but with a time delay, namely only after each new assessment of the unknown parameters of the mathematical model.

In view of the above, an object of the invention is to disclose a method and a control system permitting the continuous provision of current assessed values without time delays, in particular in order to adapt the point of application when wear of the brake linings during a brake operation cannot be ignored, what may happen e.g. at very high temperatures of the brake.

SUMMARY OF THE INVENTION

According to the present method, this object is achieved in that a) the actual values of the actuator position ($\phi_{meas}$) and of the clamping force ($F_{meas}$) continuously undergo low-pass filtering, b) time derivatives ($\dot\phi_{meas,filtp}$, $\dot F_{meas,filtp}$) of the filtered values of the actuator position ($\phi_{meas,filt}$) and the clamping force ($F_{meas,filt}$) are determined, c) a quotient $Q = \dot F_{meas,filtp} / \dot\phi_{meas,filtp}$ is produced, d) the assessed value ($\phi_{0,assess}$) of the actuator position is calculated according to the formula ($\phi_{0,assess} = \phi_{meas,filt} - F_{meas,filt}/Q$).

e) the assessed value ($\phi_{0,assess}$) is subjected to a plausibility check, and f) the plausibilised assessed value ($\phi_{0,plau}$) is filtered in a low-pass filter of nth order, the output quantity of which corresponds to the value ($\phi_0$).

To render the idea of the invention more precise, it is arranged for that the calculated assessed value is considered as a plausible assessed value only if the filtered clamping force actual value associated with this assessed value lies within a predefined interval $F_{min} < F_{meas,filt} < F_{max}$. On the one hand, it can be avoided thereby that interferences are included overproportionally in the assessed value ($F_{meas,filt} < F_{min}$). On the other hand, it can be avoided that the assessed value, due to the linear approach, exhibits excessive deviations from the real application point ($F_{meas,filt} > F_{min}$). In an improvement of the method of the invention, the assessed values are regarded as implausible and are not considered when the quotient Q is negative, because negative values are assumed to not exist physically and, thus, can only be attributed to interferences on the detected signals.

Low-pass filtering, however, especially the production of the time derivatives of the filtered values of the actuator position and the clamping force are favorably based on a calculation algorithm, which uses an approximation of the last 2n+1 measured values by means of a polynomial of second order ($f(t) = at^2 + bt + c$), in which the filtered values and their time derivatives correspond to the parameters of the polynomial at the point n+1. This procedure is repeated with each newly added measured value. The derivative signals are respectively delayed by n moments in relation to the current measured value when 2n+1 measuring points are used for the approximation. When 2n+1=three measuring points are used, the parameters a, b and c describing the polynomial are determined without approximation so that filtering of the measured values does not yet prevail, but only a calculation of the first derivative ($f'(t) = 2at + b$) and second derivative ($f''(t) = 2a$) is possible. When using more than three measured values (e.g. 5, 7, 9 ...), the measured values will additionally be filtered because the parameters a, b, c are then determined by means of the method of least squares.

The control system of the invention for implementing the method explained hereinabove generally comprises:

a) a first controller (force-travel controller), to which signals representative of a clamping force nominal value and a clamping force actual value and signals representative of an actuator position actual value are sent as input quantities, and the output quantity of which controller corresponds to an actuator speed nominal value, b) a second controller (speed controller) that is connected downstream of the first controller and to which signals representative of the actuator speed nominal value and an actuator speed actual value are sent as input quantities, and the output quantity of which controller corresponds to an actuator torque nominal value; as well as c) a third controller (current controller) that is connected downstream of the second controller and to which signals representative of the actuator torque nominal value and an actual value of the current to be supplied to the actuator are sent as input quantities, and the output quantity of which controller represents a correcting variable for adjusting the actual value of the current to be supplied to the actuator, and d) an application-point identification module is provided, to which signals representative of the actual value of the position measured at the actuator and the actual value of the actuating force measured at the actuator are sent as input quantities, and the output quantity of which represents an assessed value of the actuator position, which corresponds to the application of the first friction surface on the second friction surface, with the signal representative of the actuator position actual value being produced by subtraction of the assessed value from the value of the measured actuator position.

The control system of the invention is favorably characterized by the fact that the application-point identification module includes low-pass filters of nth order for low-pass filtering of signals representative of the actual value of the position measured at the actuator and the actual value of the actuating force measured at the actuator, and differentiators are connected downstream of the low-pass filters for producing the time derivative of the filtered signals of the actuator position (($\phi_{meas,filt}$) and the clamping force ($F_{meas,filt}$), the output quantities of which ($\phi_{meas,filtp}$, $F_{meas,filtp}$) are sent to a first multiplication module for calculating a quotient $Q=F_{meas,filtp}/\phi_{meas,filtp}$, connected downstream of the latter is a second multiplication module in which the filtered value of the clamping force ($F_{meas,filt}$) is divided by the quotient Q, and connected downstream of which is an addition module in which the assessed value ($\phi_{0,assess}$) of the actuator position is calculated according to the formula ($\phi_0=\phi_{meas,filt}/Q$).

A favorable improvement of the control system of the invention resides in that connected downstream of the addition module is a plausibilisation module in which the assessed value together with the filtered values of the actuator position and the clamping force and their time derivatives are subjected to a plausibility check.

In a favorable improvement of the control system of the invention, the plausibilisation module is succeeded by a low-pass filter of nth order, in which the plausibilised assessed value undergoes a low-pass filtering operation for producing the value of the actuator position, which corresponds to the application point.

Further details, features, and advantages of the invention can be seen in the following description of an embodiment by making reference to the accompanying drawings showing a design of a control loop for implementing the method of the invention.

DETAILED DESCRIPTION OF THE DRAWINGS

Figure 1:
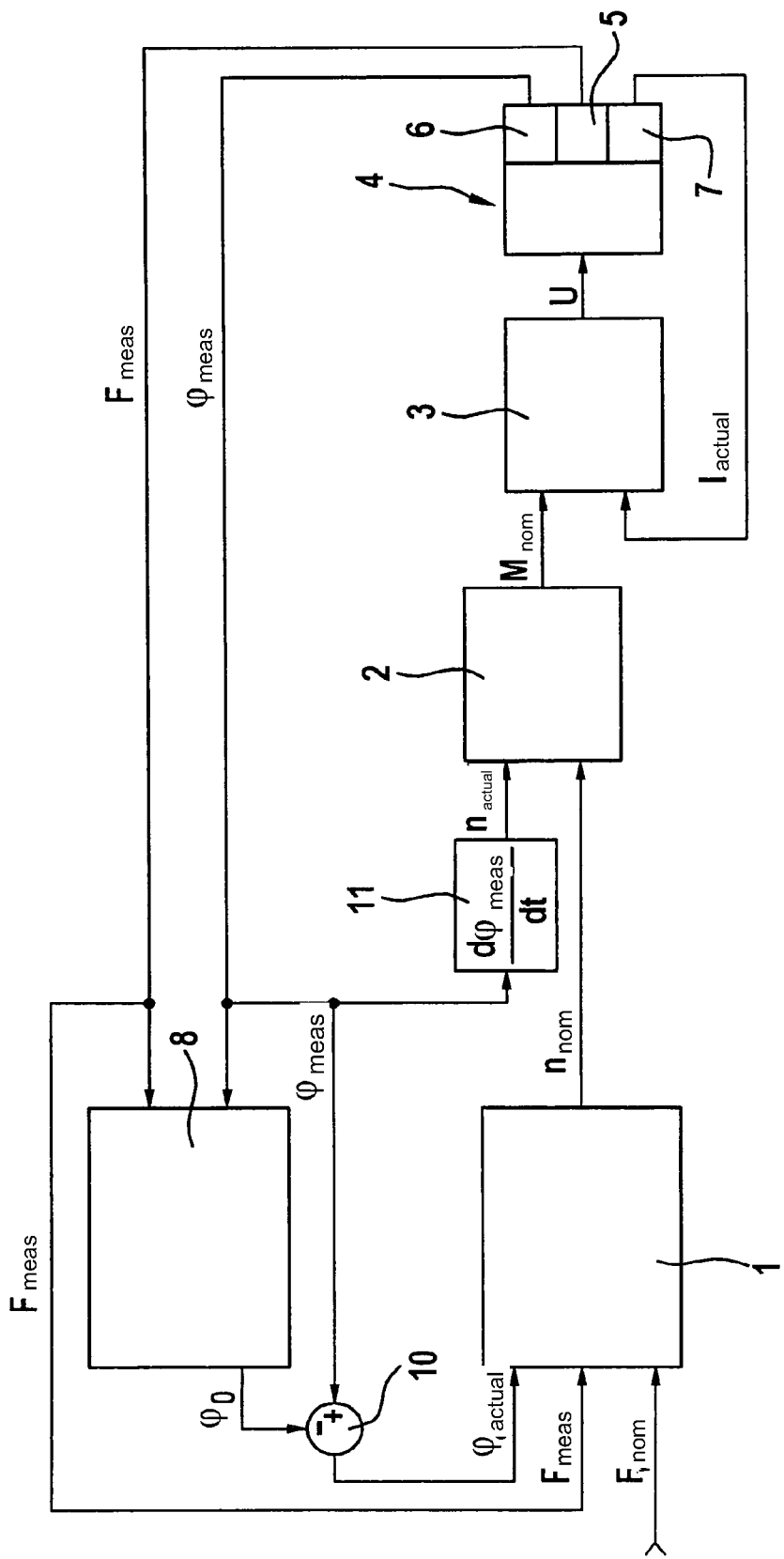
FIG. 1 is a design of a control system for implementing the method of the invention.

The control system illustrated in FIG. 1 is generally comprised of a first controller or force/travel controller 1, an application-point identification module 8 connected upstream of the force/travel controller 1, a second controller or speed controller 2 connected downstream of the force/travel controller 1, as well as a third controller or current controller 3 connected downstream of the speed controller 2, with an integrated servo booster generating a voltage U that is applied to an actuator 4 (only represented) of an electromechanically operable brake. The actuator 4 is preferably equipped with a clamping force sensor 5, a position measuring system or a position sensor 6 and a current sensor 7, with an output signal $F_{meas}$ of the clamping force sensor 5 representative of the measured clamping force being sent as a first input quantity to the application-point identification module 8, and an output signal $\phi_{meas}$ of the position measuring system 6 representative of the measured actuator position being sent as a second input quantity to the application-point identification module 8. The signal $I_{actual}$ of the current sensor 7 that corresponds to the actuator current actual value is sent as an input quantity to the current controller 3 mentioned hereinabove.

Further, it can be taken from FIG. 1 that a first output quantity $\phi_0$ of the application-point identification module 8 that corresponds to an application-point position is subtracted in a subtracter 10 from the output signal $\phi_{meas}$ representing the above-mentioned measured actuator position, and the result of the subtraction, meaning an actuator position actual value $\phi_{actual}$, is sent as a second input quantity to the force/travel controller 1. A clamping force nominal value $F_{nominal}$ predetermined by the vehicle operator represents a third input quantity of the force/travel controller 1.

The input quantities of the speed controller 2 represent the output quantity of the force/travel controller 1 that corresponds to the actuator speed nominal value $n_{nominal}$, and an actuator speed actual value $n_{actual}$, which is produced in a differentiator 11 by differentiation of the above-mentioned signal $\phi_{meas}$ that corresponds to the measured actuator position as a function of time. The output quantity of the speed controller 2 corresponds to a nominal value $M_{nominal}$ of the brake torque applied by actuator 4.

The mode of operation of the control circuit illustrated in FIG. 1 and, respectively, the implementation of the method of the invention will be explained in detail in the following text by making reference to FIGS. 2 and 3.

Figure 2:
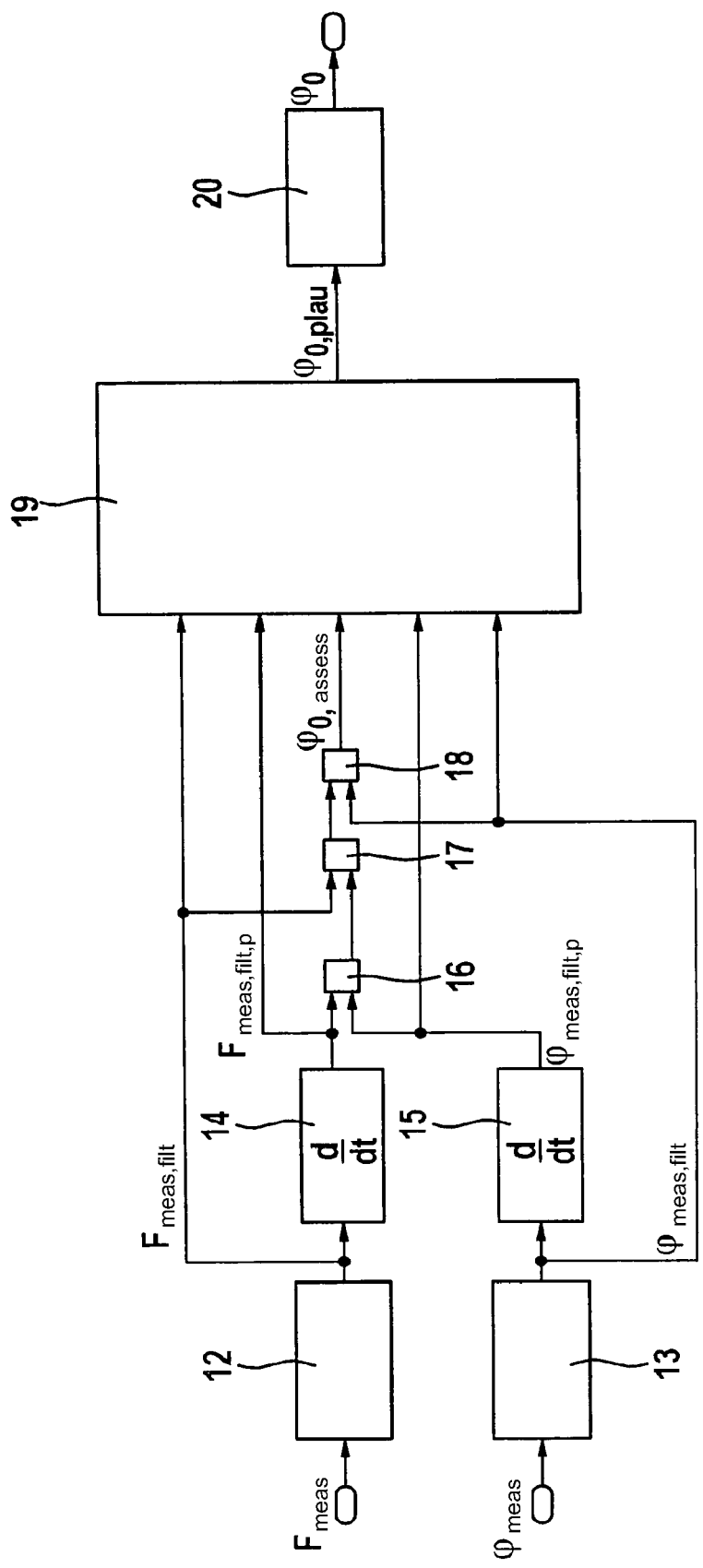
FIG. 2 is the design of an application-point identification module used in the control system of FIG. 1.

As has already been mentioned, FIG. 2 shows the design of the application-point identification module 8 with the input quantities $F_{meas}$, $\phi_{meas}$. The output signal $F_{meas}$ of the clamping force sensor 6 representative of the measured clamping force or the actual value of the clamping force is sent to a first low-pass filter 12, the output quantity $F_{meas,filt}$ of which is sent to a first differentiator 14, in which its derivative is produced as a function of time $F_{meas,filtp}$. The signal $\phi_{meas}$ representative of the actuator position measured at the actuator 4 is sent to a second low-pass filter 13, the output quantity $\phi_{meas,filt}$ of which is sent to a second differentiator 15, in which its derivative is produced as a function of time $\phi_{meas,filtp}$. As has been mentioned before, the low-pass filtering operation, especially the production of the time derivatives of the filtered values of the actuator position and the clamping force, are based on a calculation algorithm, which uses an approximation of the last 2n+1 measured values by means of a polynomial of second order ($f(t)=at^2+bt+c$), in which the filtered values and their time derivatives correspond to the parameters of the polynomial at location n+1.

The time derivatives $F_{meas,filtp}$, $\phi_{meas,filtp}$ of the filtered quantities are sent to a first multiplier 16 for producing the above-mentioned quotient $Q=F_{meas,filtp}/\phi_{meas,filtp}$, while in a subsequent second multiplier 17 the filtered value of the clamping force $F_{meas,filt}$ measured at the actuator 4 is divided by the quotient Q. The output quantity of the second multiplier 17, i.e. the result of the division $F_{meas,filt}/Q$, is subtracted in an addition module 18 from the filtered value of the actuator position $\phi_{meas,filt}$ and is subjected to a plausibilisation test in a plausibilisation module 19 together with the filtered values of the actuator position ($\phi_{meas,filt}$) and the clamping force ($F_{meas,filt}$) and their time derivatives ($\phi_{meas,filtp}$, $F_{meas,filtp}$). If the filtered clamping force actual value ($F_{meas,filt}$) associated with this assessed value ($\phi_{0,assess}$) lies within a predefined interval $F_{min}<F_{meas,filt}<F_{max}$, the calculated assessed value ($\phi_{0,assess}$) is regarded as a plausible assessed value ($\phi_{0,plau}$). If, on the other hand, the quotient Q is negative, the assessed values ($\phi_{0,assess}$) are regarded as implausible and are not considered. The plausibilised assessed value ($\phi_{0,plau}$) is subsequently filtered in a low-pass filter 20 of nth order, the output quantity of which represents the position value ($\phi_0$) that corresponds to the application point of the first friction surface on the second friction surface.

Figure 3:
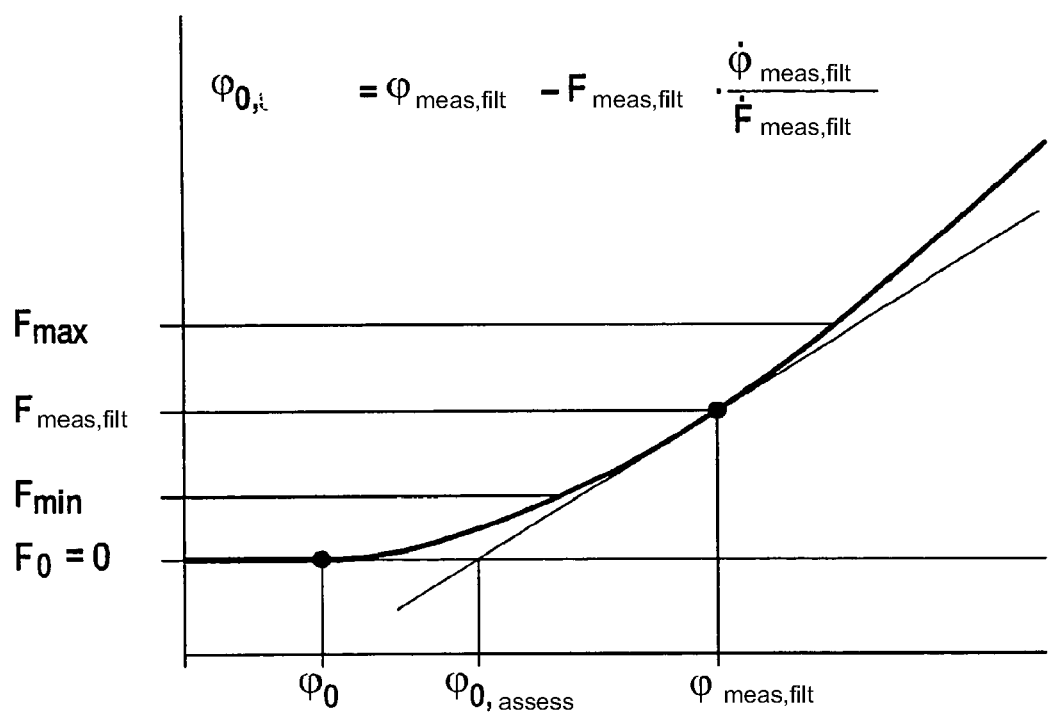
FIG. 3 shows a characteristic curve for illustrating the method of the invention.

FIG. 3 finally shows a diagram of the determination of the requested application point $\phi_0$ by way of the quantities $\phi_{0,assess}$, $\phi_{meas,filt}$, and $F_{meas,filt}$ as described hereinabove, while the plotted values $F_0$, $F_{min}$ and $F_{max}$ do not require further explanation.

The invention claimed is:

1. A method for applying defined clamping forces in a brake that is electrically operable by an actuator and includes a first friction surface (friction lining) and a second friction surface (brake disc), in between which a clearance is allowed, the method comprising:
   determining an application of the first friction surface on the second friction surface;
   determining actual values ($F_{meas}$) of a clamping force by a clamping force sensor that is communicated to a control system;
   determining an actual value ($\phi_{meas}$) by a position sensor that is communicated to the control system, wherein a correlation exists between the actuator position ($\phi_{meas}$) and the clamping force ($F_{meas}$), with a value (($\phi_0$) of the actuator position being determined which corresponds to the application of the first friction surface on the second friction surface with the control system,
   continuously low-pass filtering the actual values of the actuator position ($\phi_{meas}$) and of the clamping force ($F_{meas}$) within the control system;
   determining time derivatives ($\phi_{meas,filtp}$, $F_{meas,filtp}$) of the filtered values of the actuator position ($\phi_{meas,filt}$) and the clamping force ($F_{meas,filt}$);
   producing a quotient $Q = F_{meas,filtp}/\phi_{meas,filtp}$;
   calculating an assessed value ($\phi_{0,assess}$) of the actuator position according to the formula $$\phi_{0,assess} = \phi_{meas,filt} - F_{meas,filt}/Q;$$

subjecting the calculated assessed value ($\phi_{0,assess}$) to a plausibility check with a plausibilsation module of the control system;
   filtering the plausibilised assessed value ($\phi_{0,plan}$) in a low-pass filter of nth order within the control system to obtain, the output quantity of the value ($\phi_0$) of the actuator position that indicates the application of the first friction surface on the second friction surface; and
   controlling the actuator to apply a defined claiming force in the brake based on the determined value ($\phi_0$) with the control system.

2. A method according to claim 1, wherein the calculated assessed value ($\phi_{0,assess}$) is considered as a plausible assessed value ($\phi_{0,plau}$) only if the clamping force actual value ($F_{meas,filt}$) associated with this assessed value ($\phi_{0,assess}$) lies within a predefined interval $F_{min} < F_{meas,filt} < F_{max}$.

3. A method according to claim 1, wherein the assessed values ($\phi_{0,assess}$) are regarded as implausible and are not considered when the quotient Q is negative.

4. A method according to claim 1, wherein for low-pass filtering of the actual values of the actuator position ($\phi_{meas}$) and the clamping force ($F_{meas}$) and for producing the time derivatives of the filtered values of the actuator position ($\phi_{meas,filt}$) and the clamping force ($F_{meas,filt}$), an approximation by a polynomial of second order of the last 2n+1 values is used, in which the filtered values and their time derivatives correspond to the parameters of the polynomial at the point n+1.

5. A control system for applying defined clamping forces in a brake that is electrically operable by an actuator and includes a first friction surface (friction lining) and a second friction surface (brake disc), the control system comprising:
   a clamping force sensor (5) for determining a clamping force (F);
   a position sensor (6) for determining the actuator position ($\phi$), wherein a correlation exists between the actuator position ($\phi$) and the clamping force (F);
   a first controller (1), to which signals representative of a clamping force nominal value ($F_{nominal}$) and a clamping force actual value ($F_{actual}$) and signals representative of an actuator position actual value ($\phi_{meas}$) are sent as input quantities, and the output quantity of the first controller corresponds to an actuator speed nominal value ($n_{nominal}$);
   a second controller (2) that is connected downstream of the first controller and to which signals representative of the actuator speed nominal value ($n_{nominal}$) and an actuator speed actual value ($n_{actual}$) are sent as input quantities, and the output quantity of the second controller corresponds to an actuator torque nominal value ($M_{nominal}$);
   a third controller (3) that is connected downstream of the second controller and to which signals representative of the actuator torque nominal value ($M_{nominal}$) and an actual value ($I_{actual}$) of the current to be supplied to the actuator are sent as input quantities, and the output quantity of the third controller represents a correcting variable (U) for adjusting the actual value ($I_{actual}$) of the current to be supplied to the actuator; and
   an application-point identification module (8), to which signals representative of the actual value of the position ($\phi_{meas}$) measured at the actuator (4) and the actual value of the actuating force ($F_{meas}$) measured at the actuator (4) are sent as input quantities, and the output quantity of which represents a value ($\phi_0$) of the actuator position, which corresponds to the application of the first friction surface on the second friction surface, with the signal representative of the actuator position actual value ($\phi_{actual}$) being produced by subtraction of the value ($\phi_0$) from the signal representative of the value of the measured actuator position ($\phi_{meas}$), wherein the application-point identification module (8) includes low-pass filters (12, 13) of nth order for low-pass filtering of signals representative of the actual value of the position ($\phi_{meas}$) measured at the actuator (4) and the actual value of the actuating force ($F_{meas}$) measured at the actuator (4), and differentiators (14, 15) are connected downstream of the low-pass filters for producing the time derivative of the filtered signals of the actuator position (($\phi_{meas,filt}$) and the clamping force ($\phi_{meas,filt}$), the output quantities of which ($\phi_{meas,filtp}$, $F_{meas,filtp}$) are sent to a first multiplication module (16) for calculating a quotient $Q = F_{meas,filtp}/\phi_{meas,filtp}$, connected downstream of the latter is a second multiplication module (17) in which the filtered value of the clamping force ($F_{meas,filt}$) is divided by the quotient Q, and connected downstream of which is an addition module (18) in which the assessed value ($\phi_{0,assess}$) of the actuator position is calculated according to the formula ($\phi_{0,assess} = \phi_{meas,filt} - F_{meas,filt}/Q$).

6. A system according to claim 5, wherein connected downstream of the addition module (18) is a plausibilisation module (19) in which the assessed value ($\phi_{0,assess}$) together with the filtered values of the actuator position ($\phi_{meas,filt}$) and the clamping force ($F_{meas,filt}$) and their time derivatives ($\phi_{meas,filtp}$, $F_{meas,filtp}$) are subjected to a plausibility check.

7. A system according to claim 6, wherein the plausibilisation module (19) is succeeded by a low-pass filter (20) of nth order, in which the plausibilised assessed value ($\phi_{0,plau}$) undergoes a low-pass filtering operation for producing the value ($\phi_0$) of the actuator position.

* * * * *